Patented May 20, 1947

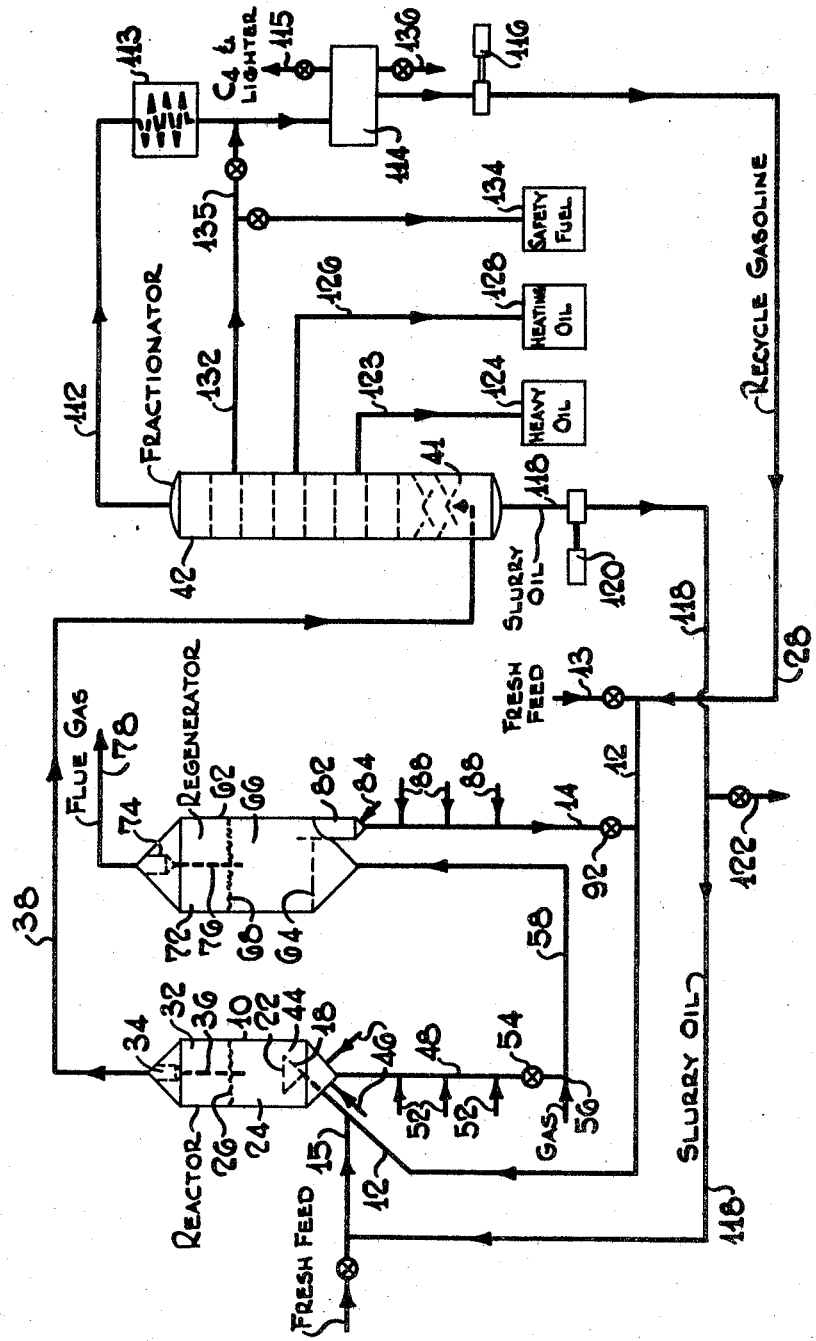

2,420,900

UNITED STATES PATENT OFFICE 2,420,900

TREATING HYDROCARBON FLUIDS

James E. Moise, Baton Rouge, La., assignor to Standard Oil Development Company, a corporation of Delaware Application September 19, 1944, Serial No. 554,812

4 Claims. (Cl. 196—52)

This invention relates to treating hydrocarbon fluids, and more particularly, relates to the catalytic cracking of hydrocarbon fluids.

In the catalytic cracking of hydrocarbon oils, such as gas oils, to produce aviation gasoline, it is known that the quality of the aviation gasoline so produced can be improved by catalytic recracking or giving the aviation gasoline another catalytic cracking treatment. This is usually done in a separate cracking system and involves the expense of additional equipment.

According to my invention, hydrocarbon oils, such as gas oils, or the like, are catalytically cracked to produce gasoline, motor gasoline or naphtha is separated, and the gasoline or naphtha is recycled with fresh gas oil feed to the catalytic cracking step. In this way, the catalytically cracked gasoline is catalytically recracked in one apparatus while the fresh gas oil feed is being catalytically cracked to gasoline. With my invention, there is improved product distribution, there is an increase in C4 yield and 1C octane number rating, and a reduction in carbon or coke yield and acid heat.

In the drawing, the figure represents one form of apparatus which may be used in carrying out my invention.

Referring now to the drawing, the reference character 10 designates a cylindrical reaction zone or vessel into which fresh gas oil feed and subdivided catalyst are introduced through line 12. In one form of the invention the fresh oil feed in vapor form or partly preheated so that it is partly in liquid form is introduced through line 13 and is mixed with hot regenerated catalyst introduced through standpipe 14 and the mixture passed through line 12 into the bottom portion of the reaction vessel 10. In the preferred form, oil feed is introduced into line 12 close to vessel 10 after the hot regenerated catalyst is mixed with the gasoline to be retreated as will be hereinafter described in greater detail.

The fresh oil feed is preferably gas oil but may be other petroleum fractions or oils, such as heavy naphtha, reduced crude, topped crude, etc. The catalyst is preferably in finely divided form and has a size between about 100 and 400 mesh with up to about 10% of 0 to 20 micron material. The catalyst is any suitable cracking catalyst, such as acid-treated bentonite clays, synthetic silica alumina gels, synthetic silica magnesia gels, etc.

For the catalytic cracking of gas oil to gasoline, about 5 parts of catalyst to one part of fresh feed by weight to 30 parts of catalyst to one part of fresh feed by weight may be used. Where the feed oil is partly or all in liquid form, larger amounts of catalyst or solid particles must be used in order to supply the heat to raise the temperature of and to vaporize the feed oil, and also to supply the heat of cracking. In cases where the catalyst is too active and large amounts of catalyst are necessary, the catalyst may be diluted with an inert solid, such as sand or other material, to act as a heat carrier. The catalyst introduced through standpipe 14 is preferably hot, regenerated catalyst at a temperature of about 900° F. to 1200° F.

The suspension of contact or catalyst particles in the oil vapors is passed through line 12 and into cone-shaped member 18 arranged in the bottom portion of the reaction vessel 10. The member 18 is provided in its top with a perforated distribution plate 22 for evenly distributing the solid particles and the oil vapors across the area of the reaction vessel 10. The velocity of the vapors is selected to fluidize the solid particles and so that the solid particles are transformed into a dense, dry, liquid-simulating mixture or bed 24 having a level indicated at 26. The velocity of the vapors is of the order of 0.5 to 5 ft./sec. and preferably between about 1.0 ft./second and 2.0 ft./second.

The mixture of hot regenerated catalyst and fresh feed together with catalytically cracked gasoline from line 28 is passed through line 12 as will be hereinafter described in greater detail. In the preferred form, valved line 13 is closed off and the hot regenerated catalyst from standpipe 14 is mixed with the catalytically cracked gasoline from line 28 and fresh feed is introduced through line 15. In this way the recycled gasoline is in contact with the regenerated catalyst at a high temperature and at a high catalyst to oil ratio for a period of time before the introduction of fresh feed so that more severe retreating is obtained. Introducing the fresh feed at 13 cools down the mixture and reduces the catalyst to oil ratio.

Above the dense bed or mixture 24 in the reaction vessel 10 is a dilute phase 32 which comprises a relatively dilute suspension of entrained solid particles in vaporous reaction products. The vaporous reaction products are passed through a separating means 34 arranged in the upper portion of the reaction vessel 10 to separate most of the entrained catalyst particles from the vaporous reaction products. The separated catalyst particles are returned to the dense bed or mixture 24 through line 36 which dips below the level 26 in the reaction vessel 10. The separated vaporous reaction products pass overhead through line 38 and are passed to a scrubbing section 41 in the lower part of fractionating tower 42 wherein the vapors are fractionated as will be presently described.

During the cracking operation the catalyst particles become contaminated or spent by the deposition of coke or carbonaceous material thereon and it is necessary to remove them from the reaction vessel 10 and regenerate them before using them in another cracking operation. The spent or contaminated catalyst particles are passed downwardly into the bottom portion of the reaction vessel 10 through a stripping section 44 arranged below the distribution plate 22. Stripping gas is introduced into the bottom of the reaction vessel 10 through lines 46 to remove entrained hydrocarbon vapors or gases from the contaminated catalyst particles. This is desirable because it removes some of the combustible material from the contaminated catalyst and reduces the amount of burning necessary in the regeneration zone.

The stripped, contaminated catalyst or contact particles are then flowed into a standpipe 48 provided with aerating lines 52 for maintaining the contact or catalyst particles in a fluidized, liquid-like condition in the standpipe 48 so that the fluidized mixture exerts a hydrostatic pressure at the base of the standpipe. At its lower end the standpipe 48 is provided with a control valve 54 for controlling the rate of withdrawal of catalyst from the reaction vessel 10. In this way the level 26 in the reaction vessel 10 may be varied as desired.

The contaminated catalyst particles, after having passed through the valve 54, are mixed with a regenerating gas, such as air, introduced through line 56, and the less dense mixture is passed through line 58 into the bottom portion of a regeneration zone or vessel 62. The hydrostatic pressure built up by the standpipe 48 and the dense fluidized mixture in the reaction vessel 10 is sufficient to force the less dense mixture in line 58 into the regeneration vessel 62.

The mixture passing through line 58 is introduced below the distribution plate 64 in the regeneration vessel 62 to evenly distribute the catalyst particles and regenerating gas across the area of the regeneration vessel 62.

The velocity of the regenerating gas is maintained preferably between about 0.5 ft./second and 2.0 ft./second to maintain the catalyst particles undergoing regeneration as a dense fluidized dry liquid-simulating mixture or bed 66 having a level indicated at 68. Above the dense bed or dense phase in the regeneration vessel 62 is a dilute phase 72 which comprises regeneration gases containing only a small amount of entrained catalyst particles. The regeneration gases are passed through a separating means 74 arranged in the upper portion of the regeneration vessel 62 for separating most of the entrained catalyst particles from the regeneration gases. The separated particles are returned to the dense bed 66 through line 76 which extends beneath the level 68 of the catalyst particles in the regeneration vessel 62.

Regeneration gases pass overhead through line 78 and may be passed through heat recovery means, such as a waste heat boiler, and may further be passed through electrical precipitators to separate additional entrained catalyst from the regeneration gases.

The separating means 34 and 74 have been shown in the drawing as cyclone separators but other forms of separating means may be used as, for example, a Multiclone separator. If desired, more than one cyclone separator or other separator may be used in series.

During regeneration the temperature is maintained below about 1200° F. and between about 900° F. and 1150° F. The hot regenerated catalyst particles are removed from the lower portion of the dense bed 66 by means of a trough or tubular member 82 which extends above the distribution plate 64. Preferably aerating gas is introduced at 84 into the bottom portion of the tubular member 82 to maintain the particles in fluidized condition. The hot regenerated catalyst particles are then passed into standpipe 14 provided with aerating or fluidizing lines 88 for maintaining the catalyst particles in fluidized condition in the standpipe 14 so that the fluidized mixture exerts a hydrostatic pressure at the base of the standpipe. The standpipe 14 is provided at its lower end with a control valve 92 for controlling the rate of withdrawal of hot regenerated catalyst particles from the regeneration vessel 62.

The hot regenerated catalyst from the standpipe 14 is mixed with vapors or gases or partly preheated liquid oil introduced through line 13 and the less dense mixture or suspension of solid particles in gaseous fluid is passed through line 12 and into the conical inlet 18 opening into the bottom portion of the reaction vessel 10. Fresh feed may be introduced through line 13 in vapor form, in liquid form, or in partly liquid and partly vapor form. When it is mixed with the hot regenerated catalyst from standpipe 14, the oil is vaporized and the mixture passing through line 12 is a suspension of solid particles in a gaseous fluid.

As above stated, instead of passing fresh feed through line 13, it is preferably introduced through line 15 into line 12 near reactor 10. With line 13 shut off, catalytically cracked motor or aviation gasoline is passed through line 28 and mixed with the hot regenerated catalyst from standpipe 14. This mixture is passed through line 12 and is joined by fresh feed from line 15, thus allowing more severe retreating than would be obtained by introducing the fresh feed at 13. The catalytically cracked gasoline is that produced in the cracking step as will be hereinafter described in greater detail.

Returning now to the fractionating tower 42, the vaporous reaction products introduced into the fractionating tower through line 38 are fractionated to separate heavier constituents from lighter constituents which pass overhead through line 112. Any suitable cooling means may be used in the top of the tower 42 to provide reflux condensate therefor. The bottom of the tower 42 may be provided with heat exchange means for maintaining the bottom of the tower at the desired temperature.

The lighter constituents are condensed in condenser 113 and passed to a gas separator 114. $C_4$ and lighter gases are taken off overhead through line 115 and a $C_5$—300° F. or a $C_5$—400° F. liquid cut is withdrawn from the bottom of separator 114 and pumped through line 28 by pump 116. From the above it will be seen that a $C_5$—300° F. or a $C_5$—400° F. cut may be recycled as the catalytically cracked gasoline to reactor 10.

The bottoms from the fractionating tower 42 contain some catalyst particles which were carried over with the vaporous reaction products from line 38 and also contain heavier cracked constituents. These bottoms comprising a slurry of catalyst are withdrawn through line 118 and a part or all may be pumped by pump 120 to line 15 for admixture with fresh feed or for separate introduction through line 12 into reactor 10. The bottoms may be withdrawn from the system through line 122.

Higher up in the fractionating tower 42 a side stream is withdrawn through line 123 and comprises a heavy cycle oil which is collected in drum 124. Higher up in the tower 42 another side stream is withdrawn through line 126 and comprises a heating oil which is collected in receiver or drum 128. Still higher up on the fractionating tower 42 another side stream or fraction is taken off through line 132 and passed to a receiver or drum 134. The side stream withdrawn through line 132 comprises a safety fuel. A portion or all of the safety fuel may be passed through line 135 and admixed with condensed overhead from tower 42 and the mixture withdrawn through valved line 136.

Aviation gasoline produced by catalytic cracking contains paraffins, naphthenes, aromatics and olefins. The aviation gasoline has a boiling range of about 115° F. to 325° F. Aviation gasoline produced by catalytic cracking has a relatively high acid heat which means that it has a relatively large amount of olefins. To improve the aviation gasoline it is necessary to either remove the olefins or to convert them to naphthenes or aromatics or to convert them to paraffinic hydrocarbons. One method of improving the quality of aviation gasoline produced by catalytic cracking is to subject the aviation gasoline or motor gasoline to a second catalytic cracking step.

According to my invention, the catalytically cracked motor gasoline is in part recycled to the reaction vessel 10 where it is again subjected to catalytic cracking treatment while the gas oil or feed oil is being catalytically cracked to produce gasoline. Or aviation gasoline may be recycled.

At least a portion of the gasoline as a $C_5$—300° F. or $C_5$—400° F. cut is withdrawn from the receiver or drum 114 through line 28 and passed by pump 116 to line 12 wherein the aviation gasoline is mixed with hot regenerated catalyst from the standpipe 14. In passing through the reaction vessel 10, the aviation or motor gasoline is again subjected to catalytic cracking to remove the olefins or transform them into constituents which are desirable in aviation gasoline. I prefer to recycle the motor gasoline fraction because the heavier components 300–400° F. are further cracked to produce more aviation gasoline and higher yields of $C_4$ hydrocarbons.

At least part of the gasoline is withdrawn from the receiver 114 through line 136.

The aviation gasoline recovered after the recycling operation has an increased 1C and 3C octane rating and a decreased acid heat as compared to aviation gasoline which was produced by catalytic cracking of gas oils and not catalytically retreated. By recracking the motor or aviation gasoline in the same vessel as the catalytic cracking of gas oil, there is better product distribution with an increase in $C_4$ yield and a reduction in coke or carbonaceous deposit on the catalyst in the reaction vessel 10.

The following data are the result of an operation carried out by catalytic cracking of gas oil and recycling of at least part of the catalytically cracked gasoline to the catalytic cracking step. In this example, debutanized naphtha equal to about 40% by volume of fresh feed charged or nearly 100% of the 400° F. E. P. net gasoline production resulting from the first operation was recycled to the reaction vessel 10. The naphtha recycled amounted to 27 barrels per day.

|  | Once Thru | Naphtha Recycle |
| --- | --- | --- |
| Feed to Reactor | 500–700° F. paraffin base gas oil. | Gas oil+catalytically cracked gasoline. |
| Catalyst | Synthetic $SiO_2$, $Al_2O_3$ | Synthetic $SiO_2$, $Al_2O_3$ |
| Oil Feed Rate B/D | 69 | 67.5. |
| Weight per cent Steam | 9.6 | 9.9. |
| Average Cracking Temp., ° F | 875 | 874. |
| Cat. to Oil Ratio by Weight on Fresh Feed | 7.4 | 7.5. |
| Cat. residence time, Min | 8.3 |  |
| Weight of Oil per hour per Weight of Catalyst in Reactor on Fresh Feed | .97 | .95. |
| Slurry Recycle B/D | 6.9 | 6.9. |
| Yields, per cent on Feed: |  |  |
| Volume per cent 400° I. B. P. Bottoms | 39.6 | 42.2. |
| Weight per cent Dry Gas | 6.8 | 7.7. |
| Weight per cent Carbon | 3.4 | 2.7. |
| 100 minus Volume per cent Cycle Oil | 60.4 | 57.8. |
| Volume per cent Total $C_4$ | 15.6 | 17.1. |
| Volume per cent i-$C_4H_8$ | 1.2 | 1.6. |
| Volume per cent n-$C_4H_8$ | 2.8 | 3.2. |
| Volume per cent $C_4H_{10}$ | 11.6 | 12.3. |
| Weight per cent propylene | 3.6 | 4.4. |
| Aviation Gas Yields: |  |  |
| Volume per cent 7# Aviation Gas | 27.0 | 22.5. |
| Volume per cent Heavy Naphtha | 11.2 | 9.8. |
| Volume per cent Excess $C_5$ | 4.5 | 6.8. |
| 7# Gasoline, ° A. P. I. | 60.4 | 58.8. |
| Per cent at 221° F | 62 | 56.5. |
| 90 per cent ° F | 292 | 294. |
| Acid Heat ° F | 68 | 42. |
| Octane No.—A. S. T. M. clear | 81.5 | 81.7. |
| Octane No. Avia. 1-C+4 cc. TEL | 93.2 | 94.5. |
| Heavy Naphtha ° A. P. I. | 36.2 | 37.4. |
| 400 I. B. P. Btm. ° A. P. I. | 33.6 | 33.8. |

In the recycle operation, debutanized 400° F. end point naphtha was recycled and as this naphtha contains constituents higher boiling than the end point of aviation gasoline, apparently some of these higher boiling constituents are further cracked to produce lower boiling constituents within the aviation gasoline boiling range. Also in the recycle operation it is to be noted that the conversion decreased only 2.6%. While the above preferred example discloses recycling of 400° F. end point naphtha, my invention also contemplates recycling catalytically cracked aviation gasoline which has a lower end point than the 400° F. end point gasoline or naphtha recycled in the example.

The amount of catalytically cracked motor gasoline or aviation gasoline recycled to the catalytic cracking step where gas oil is cracked may vary between about 10% by volume and 60% by volume of the fresh feed charged.

The recracked aviation gasoline withdrawn from the drum 114 through line 136 may be further treated as by acid treating or hydrogenation to further improve the quality of the aviation gasoline.

Suitable cooling means are provided for the side streams passing through lines 123, 126 and 132 before the side streams enter their respective collecting drums.

While I have shown one form of apparatus for carrying out my invention and have disclosed one specific example, it is to be understood that these are by way of illustration only and various changes and modifications may be made without departing from the spirit of my invention.

What is claimed is:

1. In a process for producing gasoline by cracking higher boiling hydrocarbons wherein a stream of fresh oil to be cracked is passed through an initial cracking zone containing an active cracking catalyst maintained at active cracking temperature at a rate which will substantially crack said oil into gasoline constituents, said catalyst being continuously circulated first through said cracking zone and thereafter through a regenerating zone in which the catalyst is heated and regenerated by burning combustible deposits therefrom before being returned to the cracking zone and wherein the cracked vapor products are fractionated to separate an olefinic gasoline fraction; the method of reducing the amount of olefins contained in said gasoline which comprises intermixing a portion of said olefinic gasoline with hot regenerated catalyst while said catalyst is substantially at regeneration temperature, thereafter combining said stream of fresh oil with said mixture and passing the resulting effluent through said cracking zone.

2. In a process for producing gasoline from higher boiling hydrocarbons wherein a stream of fresh oil to be cracked is passed in vapor form upwardly through a cracking zone containing a body of finely divided cracking catalyst maintained in a dense, turbulent condition by the vapors rising therethrough, a stream of said catalyst being continuously withdrawn from said cracking zone and introduced into a regenerating zone through which a stream of oxidizing gas is passed upwardly at a velocity adjusted to maintain a relatively dense, turbulent phase of said catalyst within said regenerating zone and in which the catalyst is heated and regenerated by burning combustible deposits therefrom, a stream of hot regenerated catalyst being continuously withdrawn from the regenerating zone and returned to the cracking zone and wherein cracked vapors are fractionated to separate an olefinic gasoline; the method of reducing the olefin content of said gasoline which comprises intermixing a portion of the olefinic gasoline with hot regenerated catalyst withdrawn from the regenerating zone while said catalyst is substantially at regeneration temperature before returning said catalyst to the cracking zone whereby said gasoline is treated with freshly regenerated catalyst before said catalyst is contacted with said fresh feed.

3. In the process defined in claim 2, the further improvement which comprises intermixing said hot regenerated catalyst with said olefinic gasoline and thereafter with said fresh feed before passing said catalyst to the cracking zone.

4. In the process defined by claim 2, the further improvement which comprises intermixing a portion of said olefinic gasoline with the hot regenerated catalyst in an amount between about 10% and 60% of the fresh feed passing to the cracking zone.

JAMES E. MOISE.

REFERENCES CITED

The following references are of record in the file of this patent:

UNITED STATES PATENTS

| Number | Name | Date |
|---|---|---|
| 2,298,355 | Egloff | Oct. 13, 1942 |
| 2,327,175 | Conn | Aug. 17, 1943 |
| 2,328,178 | Teter | Aug. 31, 1943 |
| 2,358,888 | Thomas | Sept. 26, 1944 |
| 2,128,220 | Cooke | Aug. 30, 1938 |
| 2,300,240 | Thomas II | Oct. 27, 1942 |
| 2,353,119 | Workman | July 4, 1944 |
| 2,353,731 | Kanhofer | July 18, 1944 |
| 2,374,095 | Helmers | Apr. 17, 1945 |